United States Patent
Huse

[11] 3,931,012
[45] Jan. 6, 1976

[54] SEWAGE TREATMENT SYSTEM
[75] Inventor: Henry Huse, Darien, Conn.
[73] Assignee: Atlantic Fluidics, Inc., Stamford, Conn.
[22] Filed: Feb. 19, 1974
[21] Appl. No.: 443,255

[52] U.S. Cl. ............... 210/152; 110/8 A; 210/400
[51] Int. Cl.² .............................................. B01D 33/00
[58] Field of Search ............ 210/64, 65, 66, 67, 68, 210/124, 152, 160, 198, 205, 218, 400, 401, 526; 110/8 A, 8 E

[56] References Cited
UNITED STATES PATENTS

| 2,855,494 | 10/1958 | Kuebler | 110/8 E |
|---|---|---|---|
| 2,880,875 | 4/1959 | Alston | 210/401 |
| 3,081,944 | 3/1963 | Sherman | 110/8 E |
| 3,227,281 | 1/1966 | Peterson et al. | 210/401 X |
| 3,296,122 | 1/1967 | Karassik et al. | 210/64 X |
| 3,357,379 | 12/1967 | Wiley, Jr. | 110/8 E |
| 3,549,528 | 12/1970 | Armstrong | 210/64 X |
| 3,559,807 | 2/1971 | Reilly | 210/68 |
| 3,595,181 | 7/1971 | Anderson | 110/8 A |
| 3,648,630 | 3/1972 | Hobbs et al. | 110/8 E |
| 3,697,417 | 10/1972 | Teletzke et al. | 210/71 |

Primary Examiner—Theodore A. Granger

[57] ABSTRACT

A novel sewage treatment system and components thereof are presented providing in site separation of solids from liquid, incineration or other disposal means of solids, and treatment and purification of the liquid effluent.

2 Claims, 9 Drawing Figures

SEWAGE TREATMENT SYSTEM

BACKGROUND OF THE INVENTION

Sewage treatment systems in common use employ the well known biological process utilizing aerobic or anaerobic digestion. These systems rely on bacterial action to break down organic materials and in so doing the solids are reduced to inactive sludge, and the liquid is rendered aseptic and suitable for disposal.

In a typical sewage treatment plant all sewage wastes, solids and liquid, are transmitted by conduits to a centrally located treatment plant. Solid materials are broken up into fine particles and transported to collecting and settling tanks where the solids, in the form of a sludge, are allowed to settle to the bottom. Bacterial action in the activated sludge is frequently improved by agitation, injection of oxygen, heating, and other means. The time required to treat sewage is measured in days. A great deal of equipment such as settling basins, clarifiers, filters, chlorinators, etc., is required to produce final effluent suitable for disposal in rivers, streams, or lakes.

There are many undesirable aspects of presently available biological sewage treatment systems. A large network of sewage pipes must be utilized to convey sewage to the treatment plant. Such piping systems employ large diameter conduit, and where gravity flow is not possible pumping stations must be provided.

The conventional sewage treatment plants require a great deal of space for settling basins, clarification tanks and ancillary equipment. When storm drains are connected with the sewer mains an additional liquid load is imposed on the plant during rainfall.

As cities expand outward away from the centrally located treatment plant the cost of additional sewer lines goes up, and frequently existing sewers can not handle the increased load. In large municipalities sewage must be piped miles to the treatment plant.

Biological treatment is time consuming, and the long time required for treatment necessitates a large retention capacity.

Biological treatment systems as presently known do not lend themselves readily to small isolated installation in areas of low population density because of cost, space requirements, and maintenance.

SUMMARY OF THE INVENTION

This invention sets forth a novel sewage treatment system and components thereof which effectively overcome the disadvantages inherent in conventional biological treatment systems.

Sewage consists mainly of water which serves as a carrier for the solid materials. The water itself is not a principal contaminant, but through mixture with solid materials it becomes contaminated. The longer the liquid and solids are in mixing contact the greater will become the degree of contamination of the water. As an example, in a typical sanitary toilet the required amount of water for flushing is from 4 to 8 gallons. Until the time of flushing the water is pure, its source being the normal purified water supply. Upon contact with fecal and organic material the water becomes contaminated, and its degree of contamination increases in proportion to the contact time. By the time the solids-liquid mixture reaches a remote treatment plant the solids may be completely broken up and dispersed in the liquid conveying medium. Because of the enormous ratio of water to solids, and since the solids are the primary pollutant, the amount of contamination which must be treated in a conventional treatment system is approximately 200 to 250 pounds per minute.

By mechanically separating the solids from the water it is possible to remove 85 to 90 percent of the contamination. The resultant effluent therefore has only 10 to 15 percent as much pollution as it would have if all the solid materials were dispersed in the effluent. There is provided herein a system incorporating a highly effective, self cleaning, mechanical filtering means to separate solids from water as soon as possible after the pollutants have been flushed into the system. This device is located at the site where the pollution originates and therefore its effectiveness is enhanced by reducing the time of contact between water and organic contaminants. There is also provided in the system a novel and maintenance-free fully automatic incinerator to reduce the solids totally to inert ash after separation of solids from water. This is accomplished in an electrically operated incinerator utilizing high intensity radiant heat to evaporate and degasify the solids in the absence of oxygen, and by means of an electrically operated afterburner to fully consume the organic emission. The total incinerator is accomplished without air pollution in the form of smoke, odors, or vapor plume.

There is further provided a storage or retention tank for the filtered effluent and means to pump therefrom to a series of reactor columns in which the effluent is purified by means of contact with ozone.

The ozone, produced from air or pure oxygen, is normally injected into the bottom of the column and it rises by gravity to the top. The water, typically, is introduced at the top of the column and it flows downward in a counter-current direction in relation to the ozone. Reaction columns are provided in cascade arrangement so that the water continuously flows counter to the flow of ozone, and the total reaction time is regulated by the rate of flow.

A control system is included whereby all functions of the total system are fully automatic, so that the equipment operates unattended.

In accordance with the invention certain components are provided packaged and integrated and with all these components connected so that operation is automatic.

An additional feature of the invention is the use of an ozonator which by electrical discharge converts oxygen ($O_2$) to ozone ($O_3$). Since ozone reverts back to $O_2$ in approximately one-half hour the ozonator is designed for continuous operation. The ozonator can use air or oxygen as a feed source and it can be either incorporated as a part of the sewage treatment package or mounted separately.

It is a further feature of the invention to provide a sewage treatment system which can be split into separate components with the separator-filter and incinerator located at the site of sewage generation and the effluent treatment system and ozonator located at a remote site. This permits a single effluent treatment station to serve a multiplicity of separator-incinerator units located at various locations.

3

Figure 1:
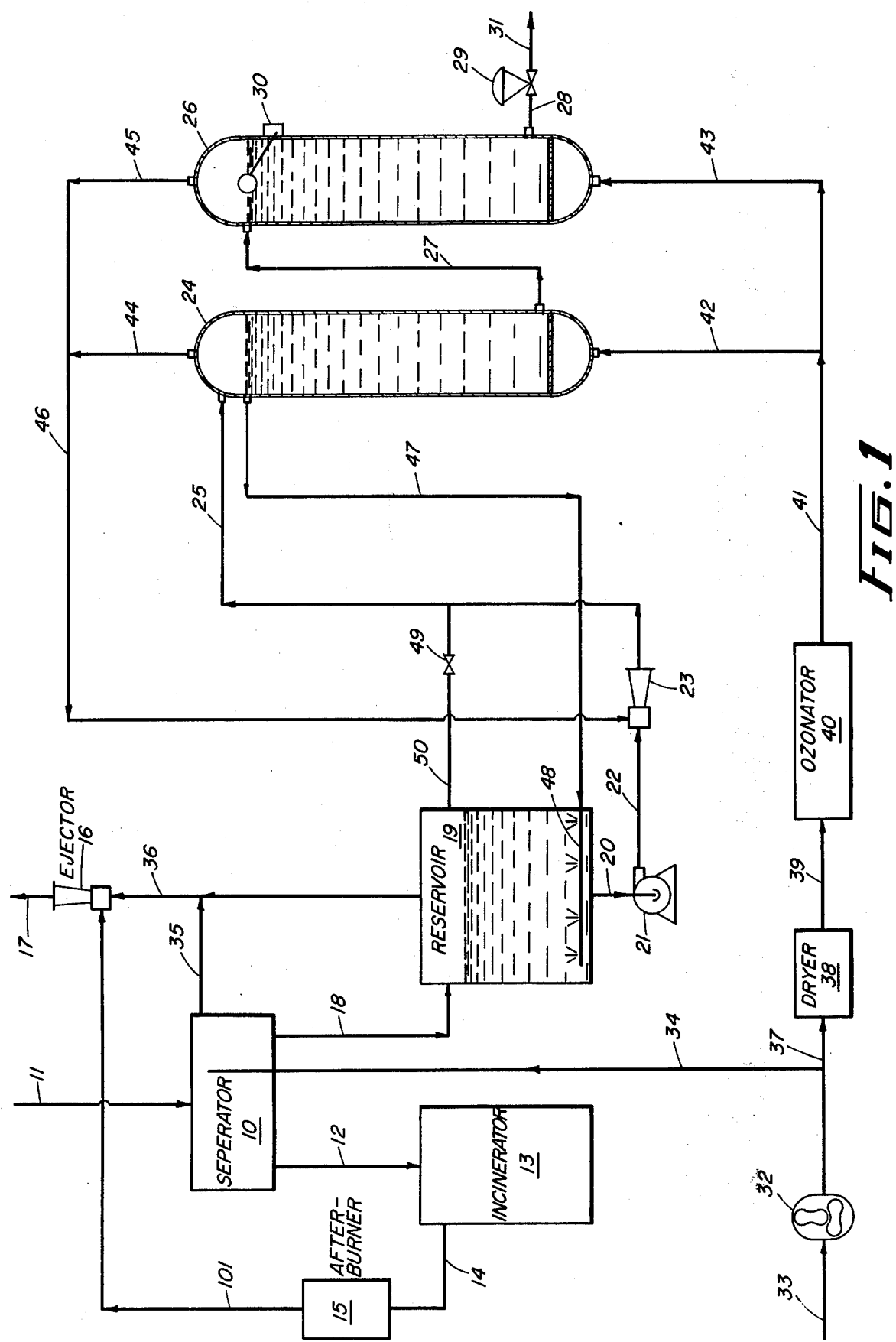
FIG. 1 is a flow diagram of a sewage treatment system constructed in accordance with the teachings of this invention.
Figure 2:
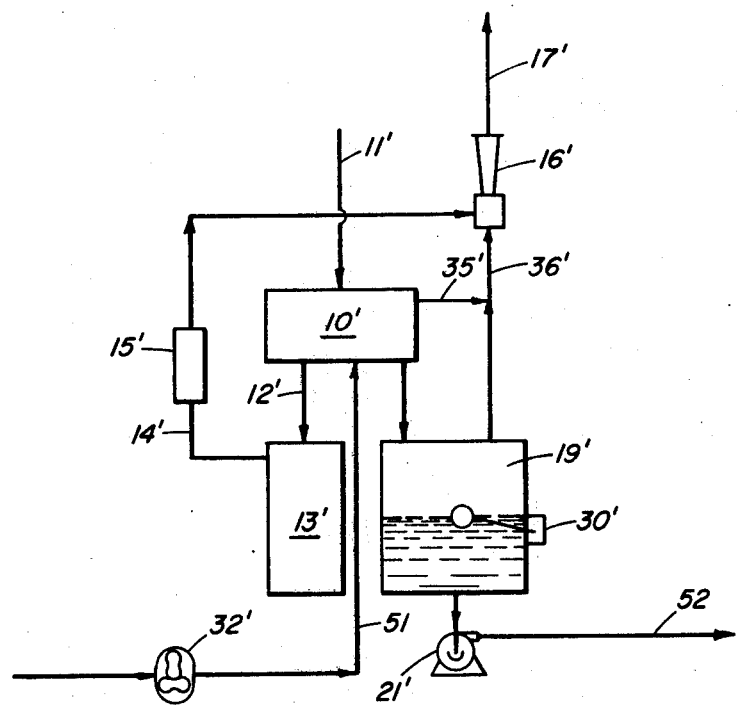
Figure 3:
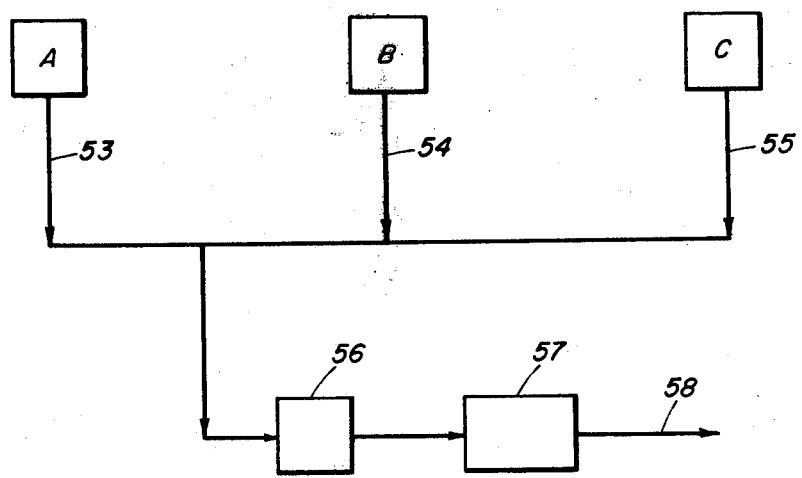
Figure 4:
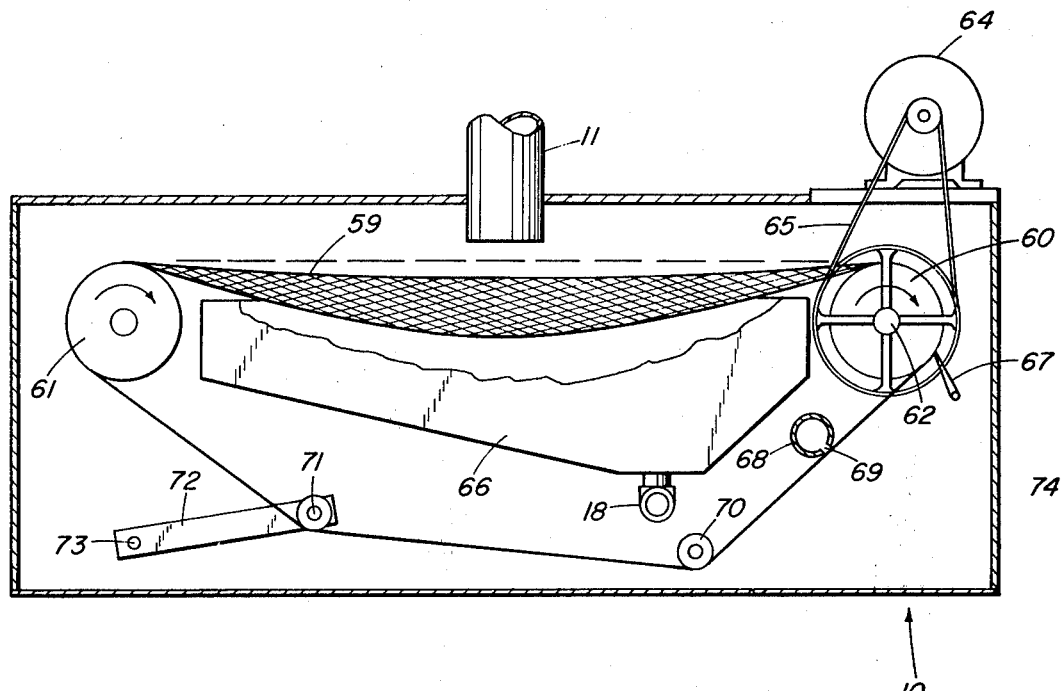
Figure 5:
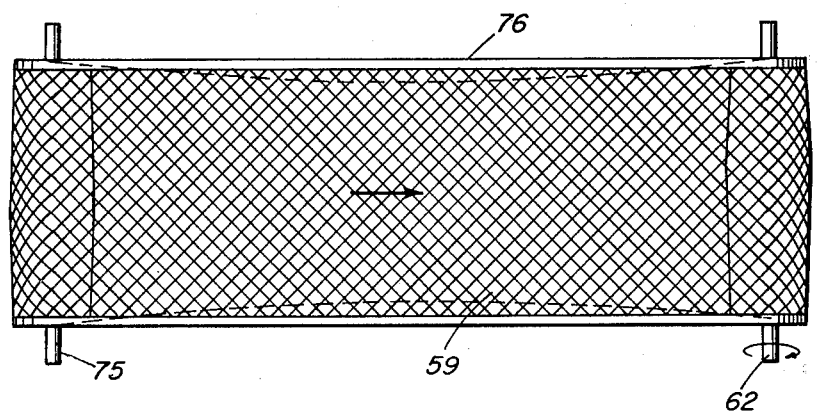
Figure 6:
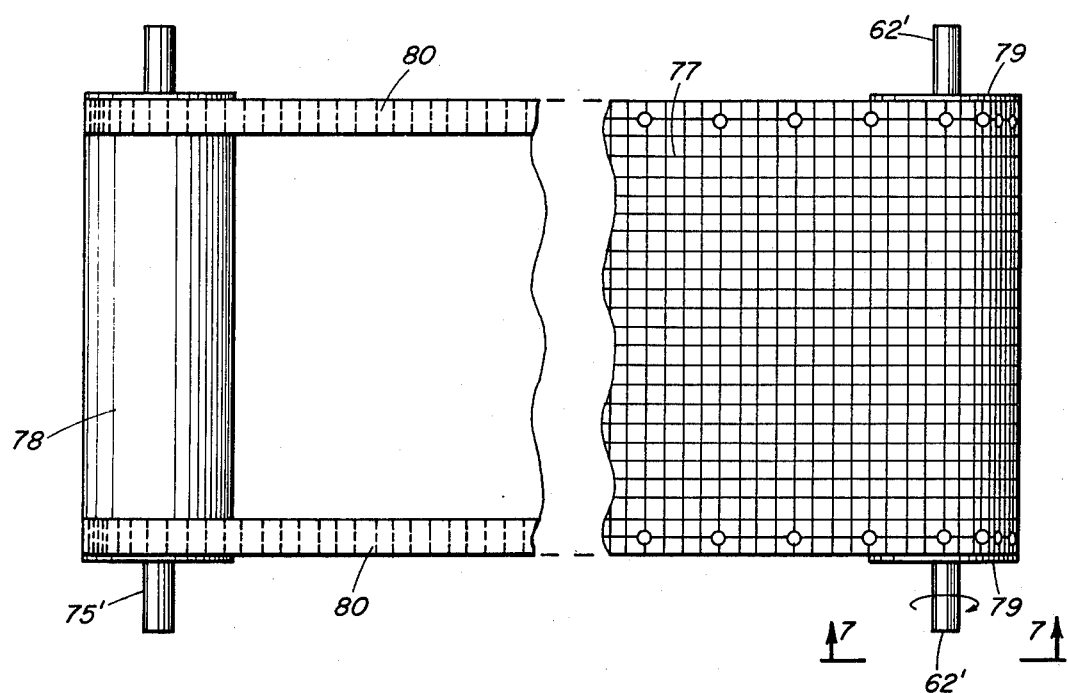
Figure 7:
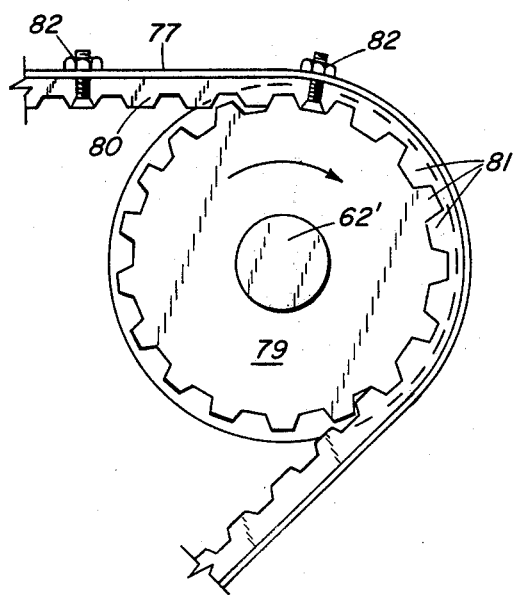
Figure 8:
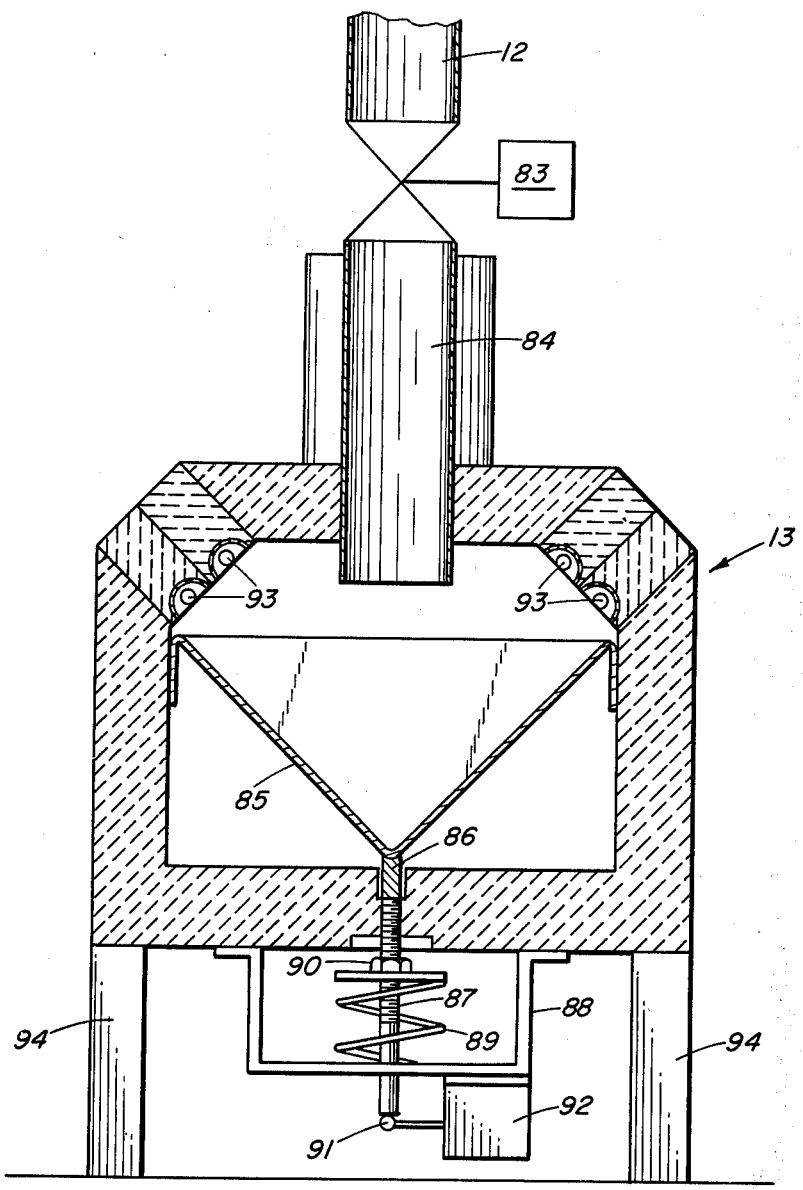
Figure 9:
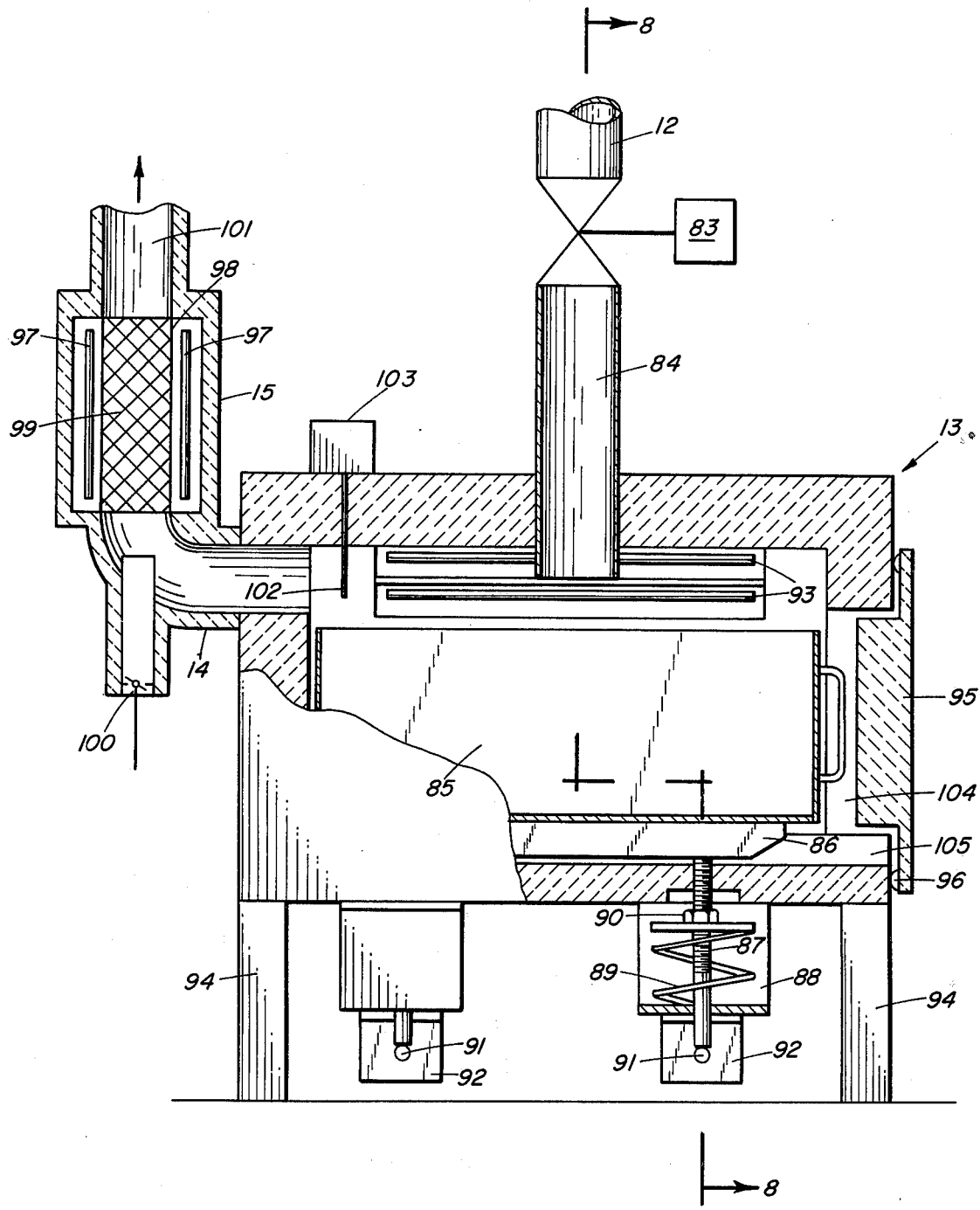

FIG. 2 is a flow diagram of a second embodiment of the invention, referred to herein as a "split system" which can be provided to more readily handle the wastes from widely dispersed units, such as housing developments;

FIG. 3 is a schematic of the split system of FIG. 2 illustrating the system as applied to three houses indicated by the letters A, B and C;

FIG. 4 is a partially sectional scale view of a solid separator employed in the practice of my invention;

FIG. 5 is a plan view of a screen utilized in the solid separator shown in FIG. 4;

FIG. 6 is a plan view similar to FIG. 5 of an alternate screen used in the practice of my invention;

FIG. 7 is a partially sectional view taken along the line 7—7 in the direction of the arrows in FIG. 6 illustrating the drive cooperating with timing belts to move the screen;

FIG. 8 is a partially sectional view of the incinerator of the invention taken along the line 8—8 in the direction of the arrows in FIG. 9; and FIG. 9 is a partially sectional elevation of the incinerator utilized in the system illustrated in FIG. 1.

DESCRIPTION OF THE PREFERRED EMBODIMENT

As seen in the figures and especially as illustrated in FIG. 1, raw sewage is transmitted by gravity to separator 10 by means of a conduit which is indicated in the figures by the numeral 11. Solids are removed in the separator 10 and transmitted by conduit 12 to incinerator 13 where the solids are burned completely and the products of combusion are then transmitted through vent conduit 14 to afterburner 15 where residual gaseous, combustibles and carbon is burned. The gases are transmitted to a venturi ejector 16 which discharges to a vent or flue 17.

The liquid from the separator 10 is discharged through conduit 18 to a reservoir tank 19. It then flows by gravity via conduit 20 to pump 21 and is pumped via conduit 22 through venturi eductor 23 to reactor column 24 via conduit 25 where it enters column 24 from the top. Liquid in reactor column 24 flows downward and out of the column at the bottom to column 26 via conduit 27. The liquid flows downward by gravity in column 26 and discharges through conduit 28 where modulating valve 29, actuated by level control regulator 30, regulates the flow from column 26 and maintains a constant static head of liquid in columns 24 and 26. The function of level control regulator 30 is to open valve 29 when liquid rises in columns 24 and 26 and close valve 29 when the liquid level is lowered. Discharged purified water from valve 29 is piped away for reuse or disposal at the conduit indicated by the numeral 31.

A compressor is shown and indicated by the numeral 32. Air from atmosphere is sucked into the compressor 32 via conduit 33 and the compressed air is routed through conduit 34 to the liquid-solids separator 10 where it is used for cleaning the separation media. Spent air from separator 10 is vented through conduit 35 to conduit 36 and ultimately vented through venturi ejector 16 and vent 17 to atmosphere. A part of the air from compressor 32 is conveyed under pressure through conduit 37 to dryer 38 where moisture is removed. The air is dried to approximately −50°F dew point in the dryer and passes through conduit 39 to ozonator 40 where by means of electrical charge some of the oxygen ($O_2$) is converted to ozone ($O_3$) and the resultant mixture of air and ozone is transported through conduits 41, 42 and 43 to the bottoms of reactor columns 24 and 26. The live pressure of air-ozone mixture is greater than the static head of liquid in the columns 24 and 26 and the air-ozone mixture bubbles up through the liquid therein. As contact is made between ozone and organic materials and contaminants in the liquid the oxidizing action of ozone destroys biochemical oxygen demand (BOD) and coliform bacteria. As the reaction takes place the ozone is consumed.

Air and unreacted ozone are collected at the tops of columns 24 and 26 and are vented via conduits 44 and 45 to conduit 46, and by action of eductor 23 the air-ozone mixture is mixed with liquid being pumped from reservoir tank 19. The liquid and entrained air-ozone is piped via conduits 25 for entrance to reactor column 24.

Overflow conduit 47 is also provided at the top of column 24. Conduit 47 performs two functions: (a) should the flow of liquid exceed the maximum rate at which it can be discharged through valve 29 the liquid level in columns 24 and 26 will rise, and when the liquid reaches the overflow level it is returned via conduit 47 to reservoir tank 19. (b) the air-ozone mixture at the top of columns 24 and 26 is under pressure in each and this pressure is sufficient to force the air-ozone mixture through conduit 47 to the bottom of reservoir tank 19. There it is bubbled by means of perforated pipe 48 or nozzle through the liquid contained in reservoir tank 19. When the ozone contacts the contaminated liquid in the reservoir tank 19 it is mostly spent and therefore the air vented through conduit 36 is largely free of ozone. The air and remaining ozone is finally passed under pressure through venturi ejector 16 and its velocity creates a slight draft which assists in venting incinerator 13 and afterburner 15.

The reservoir tank 19 serves as a means of storing the excess of liquid received during surge periods. The pump 21 operates continuously and a small bypass valve 49 provides for a constant flow of liquid via conduit 50, thus preventing pump 21 from running, regardless of whether or not liquid is being introduced into reservoir tank 19.

The operation of compressor 32, dryer 38, and ozonator 40 is continuous in the preferred arrangement, although bottled oxygen may also be used and in such case the dryer can be eliminated. As mentioned above, the head in columns 24 and 26 is maintained by level controller 30 and discharge valve 29 so that air-ozone or oxygen-ozone is continuously bubbled up through the liquid in columns 24 and 26. Also in the preferred arrangement the liquid-solids separator 10 operates continuously and solids are discharged to the incinerator 13 as soon as separated.

The incinerator 13 is operated automatically on a demand cycle, with heat input controlled by means of sensors not shown actuated by the weight of solids or level in the combustion chamber. Heat input to the incinerator 13 and afterburner 15 is applied simultaneously, and the incineration cycle is completed and heat input interrupted by means of sensors not shown actuated by weight or temperature of material in the combustion chamber.

The sewage treatment system illustrated in FIG. 1 can be a completely integrated unit capable of handling the sewage from a single source or multiple sources in close proximity. For example, the system is suitable for use in a single living unit or an apartment building containing several units. In either case the separations of solids and liquids is performed almost immediately after the waste is disposed of from sink, toilet or other source.

Another embodiment of the invention is a split system as described in FIGS. 2 and 3 which enables the treatment system to be more readily suitable for handling the wastes from widely dispersed units such as housing developments.

The principles of operation of the split system are the same as that of the integrated system illustrated in FIG. 1, involving the three steps of solid-liquid separation, incinerations of solids, and purifications of liquid. In the split system the first two steps, separation and incineration of solids, are accomplished at the site of waste generation by means of package systems. The liquid is pumped via small diameter conduit to one or more remotely located liquid purification stations.

In the system described in FIG. 2 liquid and solid wastes flow by gravity through conduit 11' to liquid-solids separator 10' from which solids are conducted via conduit 12' to incinerator 13'. By means of electrical, gas, or oil heat input the solids are burned in the incinerator and exhaust gases are vented via conduit 14' to afterburner 15' and then vented to atmosphere via ejector 16' and flue conduit 17'. The self-cleaning separator 10' is served by air compressor 32' via conduit 51. Air is vented from separator 10' via conduit 35' to vent conduit 36' and finally discharged via ejector 16' and flue 17' to atmosphere.

Liquid from separator 10' flows by gravity via conduit 18' to holding tank 19'. The liquid is piped away by means of pump 21' and conduit 52. The pump 21' operates automatically upon command from float control switch 30'.

The package system as described in FIG. 2 is compact and completely automatic, and its preferred location is as close to the source of waste generation as practicable. These units serve the function of removing solid materials from raw sewage, incinerating them automatically, and reducing the material to ash. The screened or filtered liquid is then piped away for treatment in a remotely located purification plant.

The liquid purification plant illustrated in FIG. 2 is arranged and operates in the same manner as the totally integrated system described in FIG. 1. The difference is that the influent in the FIG. 2 systems is of substantially reduced solids content, and the separation medium in separator 10' of FIG. 2 provides for finer filtration than is practical when handling raw unscreened sewage. Thus, the separator 10' can be designed for greater liquid flow and less solids separation, and the incinerator 13' can be designed for smaller incineration capacity.

Reaction columns similar to columns 24 and 26 and an ozonator similar to ozonator 29 of FIG. 1 and ancillary controls and equipment are sized to handle the liquid flow, and there is no limitation on the capacity of the purification system.

The split system thus described has several advantages over conventional sewage treatment systems.

Once the solids are removed from the sewage there is no further contamination of the liquid, and it can be piped over long distances without being loaded further with BOD, coliform bacteria, or other pollutants.

The liquid can be pumped easily by common centrifugal pumps. No special non-clogging sewage pumps are required.

The liquid can be pumped in small diameter pipe of any suitable material, such as plastic, and it is not necessary to grade the pipeline or provide pitch for gravity flow, as is required when pumping raw sewage.

By providing holding capacity at the liquid purification plant the surges in influent flow can be modulated, thus enabling the purification system to be sized for continuous operation at average flow conditions.

FIG. 3 is provided to illustrate further the utilization of the split system. The letters A, B and C in FIG. 3 represent houses or buildings separately located, each of which is served by sewage treatment systems as shown in FIG. 2. The liquid is pumped through conduits 53, 54 and 55 to a holding or surge tank 56 from which it is pumped to liquid purification system 57 and finally disposed of via conduit 58.

For proper operation of the system, and in order to minimize the oxidation requirements of the liquid purification system as efficient solids separator such as is indicated by the numeral 10 in FIG. 1 and the numeral 10' in FIG. 2, is required. In order that the separator be fully automatic it can not become plugged and therefore it must be of a self-cleaning design. A self-cleaning screen separator used in the operation of the sewage treatment system is shown in FIG. 4.

When handling raw sewage stationary screens are not suitable for continuous separation because they become clogged. They are suitable only for batch separation. Rotary drum or disc filters utilizing vacuum are used for separating solid materials from slurries. These machines are used primarily for applications where the solids are delivered in the form of a cake, and they require a thick slurry feed so that a uniform cake can be formed on the filtering medium. Inclined stationary screens have the disadvantage of being limited in the type or size of materials that can be effectively separated. None of the above means of solids-liquid separation can effectively handle raw sewage and provide the quality of effluent required by the sewage treatment system.

A feature of this invention is a liquid-solids separator utilizing an endless screen driven continuously or on a start-stop cycle. The screen is made of metal wire or synthetic filament. The open area is designed to provide optimum separation on sewage wastes from toilets, showers, sinks, kitchen utensils and related sources. One feature of the invention is a screen having the flexibility to form a concavity in which the solids-liquid mixture is cradled. This hammock effect provides a self-regulating means of offering increased screening surface as the weight of material is increased. The sagging of the middle of the screen prevents spilling of liquid over the edges and ends of the screen surface, and this is of vital importance because the sewage received by the screen comes in surges. No retaining walls, baffles, etc., are required as would be needed with a flat screen. Another feature of the separator is a cleaning device which reconditions the screen, removing material clinging to the screen, and provides a continuous clean screen to receive and separate the solids-liquid mixture. This cleaning means is accomplished by means of an air jet blowing through the screen in a direction counter to the direction of flow of liquid through the screen. This air jet is provided by a slotted tube through which compressed air is blown. The screen passes over the slotted tube and air jetted therefrom blows off any clinging material and liquid, thus cleaning and unclogging the screen.

Another feature of the invention is a blade or scraper which assists in removing solid material from the screen. This blade is held in tension against the screen at the point where solids are removed from the screen. Assisted by gravity the solids drop into a bin serving the incinerator.

Another feature of the invention is a liquid collection tray or hopper whereby the strained or screened liquid falling through the screen by gravity is collected and piped to the purification system.

Another feature of the invention is a series of belt pulleys and idlers which serve to maintain tension on the endless screen and provide sufficient friction on the drive roll to provide horizontal movement of the screen.

A feature of the invention is a means of attaching the screen to timing belts or chain drives so that the screen is always properly centered and motion is imparted to the screen by positive means rather than by friction of the screen on the drive pulley.

This fully automatic self-cleaning separator provides a superior means of separating sewage solids from its conveying liquid. Dewatering and separating is accomplished by simple gravity flow, requiring no vacuum pumps, high pressure pumps, and attendant pressure or vacuum vessels, seals, and mechanisms. Wear on the screen is minimal due to the fact that belt speeds are relatively slow and the only forces on the screen are those imposed by the weight of solids and liquid on the screen. The endless screen described herein is unique in that the woven wire or syntehtic screen is ideally made so that the mesh is in one embodiment arranged on the bias with the strands of wire or synthetic lying approximately 45° from the direction of travel. This bias arrangement provides stretching in the length and width so that as a load is applied to the center of the screen it will sag to form a hammock-like concavity. This concave shape holds the solids-liquid mixture; the liquid freely flows through the screen and the solids are retained. It can be seen that as the belt moves horizontally to the drive roll the screen, to conform to the flat shape of the roll must move in an inclined plane with the inclination to the front. Thus, any liquid not yet strained through the screen will flow back down the incline to be drained through the clean screen traveling forward from the rear roll. The solids remain on the screen until removed by gravity and scraping.

This invention is not limited to a bias arranged screen and also includes the use of screens having mesh arranged in the fore and aft direction with sufficient slack provided to form a concavity as with the bias arranged screen. This arrangement can be achieved by fastening the edges of the screen to a timing belt or chain which serve to provide a drive for the belt and also keep the edges elevated above the center of the screen.

Referring to FIGS. 1 and 4 the separator 10 consists of a woven screen 59 made of wire or syntehtic mesh supported by drive roller 60 and idler roller 61. The drive roller 60 is carried on shaft 62 to which is attached drive pulley 63. Motor 64 drives roller 60 by means of V-belt 65 and motor pulley 63. Material is fed on the screen 59 via conduit 11 by gravity. Liquid is strained through the screen and collected in collection hopper 66, and thence the liquid is discharged through drain 18. Solids are conveyed on screen 59 by means of doctor blade 67 and gravity. The screen passes by and contacts air conduit 68 which is provided with a longitudinal slot 69.

Air jetting through slot 69 passes through screen 59 and in so doing blows off solids and liquid adhering to the screen, thus cleaning it. The solids fall by gravity to a hopper not shown from which it is fed to the incinerator 13 of FIG. 1. The screen 59 passes over idler roller 70 and is kept in tension by idler roller 71 held by lever arms 72 pivoting on pins 73. The entire assembly is contained in suitable enclosure such as is indicated by the numeral 74. The drive arrangement shown in FIG. 4 illustrates a V-belt drive for purposes of illustration. Any other type of drive, such as chain or gear, can be used and is included in the scope of this invention.

FIG. 5 is a plan view of endless screen 59 of woven wire or synthetic filament with the strands arranged on a bias as related to the direction of travel. The screen 59 moves horizontally in the direction of the arrow in FIG. 5 under the influence of shaft 62. The shaft of idler 61 is shown and indicated by the numeral 75. The edges of the screen are trimmed by flexible bindings 76 of material which serves to prevent fraying of the bias cut screen 59. The flexibility of the screen 59 and edge binding 76 results in a hammock-like configuration when material is loaded in the center of the screen. This concavity contains the solids-liquid mixture and prevents liquid or solids from spilling over the edge of the screen.

In FIG. 6 an alternate form of screen is shown. In this endless screen of woven wire or synthetic filament the strands are arranged parallel to and at right angles to the direction of travel. The screen in FIG. 6 is indicated by the numeral 77 and moves horizontally as driven by pulley 78 on shaft 75'. Pulley 78 is connected to pulley 79 on shaft 62' by notched timing belts 80 which cause pulleys 78 and 79 to rotate in like direction and speed. The notched timing belts 80 are engaged by cogs 81 as shown in FIG. 7, which insure that both belts are driven at the same speed, thus the screen 77 is not distorted. The screen 77 is secured to the belts 80 by means of fasteners 82 which can be in the form of snaps, hooks, screws, or other means. The screen 77 is provided with ample width so that some natural sag is present. When screen 77 is loaded the belts are drawn together, thus increasing the sag in the screen and increasing its concavity. In FIG. 7 there is shown the use of notched timing belts, but chains with sprockets, or other means, are equally adaptable to the method and are included in the scope of the invention.

It is important to the practice of the invention that the solid materials be disposed of in an efficient manner which does not add to environmental pollution. Removal of the solids for treatment elsewhere would negate many of the advantages of the self-contained sewage treatment process, and such additional handling would present a health hazard and would not be economical. An economical way to dispose of the solid materials is by incineration, because only a small amount of residual inert ash would need to be removed. The solids discharged by the separator 10 have a water content, and because of additional water which is carried along with the solid materials the material to be incinerated is of lumpy slurry-like consistency, with heavier material settling to the bottom and lighter material on the top. The inconsistency and high water content creates substantial problems in burning, and existing incinerators are not suitable for burning the solids-liquid slurry discharged by the separator.

Incinerators designed to burn loose materials are normally provided with fixed or moving grates to support the material, and combustion is achieved by applying heat, when moisture content does not permit self-combustion, and combustion air. This type of incinerator is not suitable for burning wet materials.

Fluidized bed incinerators are used successfully to incinerate materials in slurry form. Such systems require substantial combustion air, spray nozzles to inject the slurry into the combustion chamber, and a bed medium of amorphous material or sand to provide surface for support of the materials being burned. The sand or bed material must be continuously regenerated, and a complicated scrubbing arrangement is required to prevent discharge of pollutants out of the vent stack. Such incinerators are usually of very large size and operate continuously. For the above reasons fluidized bed incinerators are not practical for use on package treatment plants.

A unique incinerator 13 is presented herein which is important to the functioning of the system. This provides optimum performance when burning materials of the type discharged from the separator. It has the advantages of being fully automatic, it effectively reduces to inert ash any material being fed to it, and it operates on a batch basis so that energy is consumed only when a volume of material has been collected. Because of the unique design combustion is totally free of discharge smoke, odor, or vapor flume. The heat energy is directed to the material by means of high intensity infrared radiation, and so the material is never in direct contact with the heat source. There is no reduction of efficiency due to ash or slag creating an insulating barrier against the heat energy source. This is because the heat is directed to the top of the material which is always exposed to the high intensity heat. Ash collects on the bottom of the incinerator vessel and does not retard heat input to the material being burned.

The unique incinerator dexcribed herein is all electric; however, gas or oil could be used as an alternate heat source and such other fuels are also included as a part of the invention. The incinerator is fully automatic, and the incineration is done on a batch basis according to a demand. In the preferred arrangement the heat is applied upon a signal from sensors which determine the weight of material collected in the incinerator vessel. Level control sensors can also be used, but they are subject to clogging and are therefore not reliable. As soon as combustion has been completed the heat input is cut off by means of temperature switches or sensors actuated by weight of the vessel.

The incinerator 13 is shown in detail in FIGS. 8 and 9 wherein the solids are transmitted from the separator 10 (not shown in FIG. 8 and 9) through conduit 12, valve 83, and conduit 84 and drop by gravity into the incinerator vessel 85. The solids slurry material collects in vessel 85 which is supported by a beam 86 which rests on support rods 87. The rods 87 are supported on frame 88 by spring 89 and adjustment bolt 90. As the weight of vessel 85 is increased by addition of solids the springs 89 are compressed and rod 87 is depressed. The rods 87 are spring loaded and connect to lever arm 91 of electric switch 92.

When lever arms 91 are depressed to a set level the switch 92 is actuated. The switch 92 energizes motorized valve 83 which closes, and infra-red radiant heating elements 93 are energized. The infra-red heaters 93 are normally constructed with tungsten elements contained in quartz tubes of well known design. The heaters 93 direct radiant energy from the high temperature (4000° – 5000°F) filament to the material to be incinerated. The heaters 93 are contained in reflectors of ceramic, aluminum, or other suitable material, and they are so arranged that the infra-red radiation is directed over a narrow beam to the material contained in vessel 85. It should be pointed out that the incinerator vessel 85 and heaters 93 are contained within an insulated chamber supported by legs 94. The vessel 85 can be removed via insulated door 95 which has gasket 96 to provide an airtight seal.

Intense heat is directed to material in vessel 85 and as it is absorbed the temperature of material rises until the boiling point of the material has been reached. Since heat is directed at the top of the boiling slurry steam is liberated evenly and the material is dehydrated without turbulence as would occur if heat were applied to the bottom of the vessels. This is because the bubbles are formed at the top do not rise up through the material to be liberated at the surface.

At the same time motorized valve 83 and heaters 93 are energized additional infra-red heaters 97 are energized in insulated afterburner 15. The heaters 97 direct intense heat to conduit section 98 which is loosely filled with stainless steel, titanium, or other high temperature conducting medium 99 which, by conduction heats up to as high as 1200°F. As steam and gases are liberated from the material in vessel 85 they flow through conduit 14 and as they pass through afterburner medium 99 the steam and gas is elevated to high temperature. Convective gas currents caused by temperature differential and stack action cause balanced flapper valve 100 to open permitting air to be drawn up into the afterburner. The introduction of oxygen contained in the air permits complete combustion of unburned hydrocarbons, converting to carbon dioxide. Admission of air and raising the temperature of the steam produced superheated vapor which is expelled along with carbon dioxide through vent flue 101 and thence to an atmospheric stack. The afterburner provides the function of consuming unburned hydrocarbons and superheating the vapor so that the discharge is free of pollutants and vapor flume.

As the moisture is evaporated from the material the temperature increases until it reaches the combustion temperature of the material. It is then reduced to inert ash by pyrolysis in the absence of combustion air, and the hydrocarbon gases are consumed without smoke or odor in the afterburner 15. As soon as the temperature reaches a set point of approximately 700°F a thermostatic sensor 102 actuates temperature switch 103 which cuts off the electric energy supplying heaters 93 and 97, thus completing the incineration cycle. By means of an electrical control system the switch 92 is reactivated and motorized valve 83 is once again opened to permit solids to flow into the incinerator. Springs 89 return the vessel 85 to its original position and the incineration cycle is repeated as the vessel 85 is filled.

The amount of residual inert ash is very small and so removal is required only infrequently. When it is desired to empty the vessel 85 the door 95 can be opened and the vessel 85 is slid out. The vessel is positioned in the incinerator chamber 104 by a slot 105 in the preferred arrangement, but other methods or configurations can be used.

As seen, the invention provides a sewage treatment system which offers outstanding technical and economic advantages. The systems can be supplied as completely assembled, piped, and wired units, requiring no field erection. The total effluent treatment time can be as little as 30 minutes because of the powerful oxidizing reactivity of ozone. This eliminates the need for large storage tanks. The system is pollution-free. There are no chemical pollutants in the treated effluent, and because of the unique incinerator design no smoke, odor or steam emits from the incinerator vent stack. The system can be all electric, eliminating fuel storage tanks. However, if fuels such as gas or oil are preferred for incineration those fuels are also within the scope of the invention. The effluent is of drinking water quality and can be reused or disposed of without polluting run-off streams, rivers or lakes.

What is claimed is:

1. A sewage treatment system including in combination: an incinerator for receiving solids and burning them to inert ash, a liquid reactor column for receiving separated liquids, a separator for receiving sewage wastes containing solids and liquids and for separating the solids and the liquids, said separator including an endless screen, drive and idler pulleys supporting said screen for movement in a horizontal plane, first means for disposing said sewage wastes on said screen so that liquid flows therethrough by gravity and solids are held on said screen and dropped by gravity at one of said pulleys and second and third means for respectively delivering said liquid to said column and said solids to said incinerator;

said incinerator including a removable vessel for receiving said solids, tungsten-quartz infrared radiant heaters directed to the top of said vessel to incinerate said solids contained therewithin, an insulated first chamber enclosing said vessel and said radiant heaters, an insulated and gasketed access door to said first chamber, an afterburner, a second chamber of said afterburner, conduit means connecting said first and second chambers for flow of gas and vapor discharge from said first chamber to said second chamber, infra-red radiant heating elements external of said second chamber and heating the same, said second chamber being provided with conductive and non-corrosive material through which gases and vapor are directed whereby upon contact residual hydrocarbon gases are oxidized and vapors superheated and means for introducing air into said afterburner to act as an oxidizer;

means for introducing ozone into said column to contact the liquids therein oxidizing organic pollutants in the liquids; and level control means on said column to control liquid level in said column and by linkage to overflow valve control the flow of water through the column and maintain a constant level of water in the column.

2. A sewage treatment system in accordance with claim 1 in which water is introduced at the top of said column so that flow is in a downward direction, and includes an air compressor, dryer, and electrically operated ozone generator feeding ozone in air to the bottom of said column under sufficient pressure that the static head in said column is exceeded and ozone-air mixture bubbles up counter to the flow of water, said ozone-air mixture passing through perforated plate or gas distribution means so that maximum contact is made between water and ozone, with unreacted ozone and air collected at the top of said column and vented to discharge stack, and further including water pump means to pump water from storage tank to said column and water operated eductor means in the pipe between the pump and column with connection to top of column so that by venturi action unspent ozone plus air is introduced into the water providing mixing and reaction of unspent ozone in the heavily polluted water supply to said column.

* * * * *